United States Patent [19]

Watson et al.

[11] Patent Number: 4,878,480
[45] Date of Patent: Nov. 7, 1989

[54] RADIANT TUBE FIRED WITH TWO BIDIRECTIONAL BURNERS

[75] Inventors: James E. Watson, Southgate, Mich.; Theodore E. Davies, Hudson, Ohio

[73] Assignee: Gas Research Institute, Chicago, Ill.

[21] Appl. No.: 224,161

[22] Filed: Jul. 26, 1988

[51] Int. Cl.⁴ .............................................. F24C 3/00
[52] U.S. Cl. .................................. 126/91 A; 431/353; 432/209
[58] Field of Search .......................... 126/91 R, 91 A; 431/353, 207, 166, 170; 432/209; 237/70; 165/4

[56] References Cited

U.S. PATENT DOCUMENTS

| | | |
|---|---|---|
| 1,769,853 | 7/1930 | Orth . |
| 1,848,185 | 3/1932 | Mawha . |
| 1,900,397 | 3/1933 | Isley . |
| 2,049,478 | 8/1936 | Vigrow ............................. 432/25 |
| 2,805,709 | 9/1957 | Dailey ............................. 431/166 |
| 3,207,493 | 9/1965 | Swain ............................. 432/28 |
| 3,521,986 | 7/1970 | Eckstrom ....................... 126/91 A |
| 4,000,962 | 1/1977 | Hemingway et al. .................. 432/4 |
| 4,044,751 | 8/1977 | Johnson ............................. 126/91 A |
| 4,355,973 | 10/1982 | Bailey ............................. 432/209 |
| 4,426,360 | 1/1984 | Benedick ............................. 422/173 |
| 4,496,314 | 1/1985 | Clarke ............................. 126/91 A X |
| 4,501,318 | 2/1985 | Hebrank ............................. 165/1 |
| 4,524,752 | 6/1985 | Clarke ............................. 126/91 A |
| 4,604,051 | 8/1986 | Davies ............................. 431/166 |
| 4,671,346 | 6/1987 | Masters et al. ..................... 432/181 |
| 4,712,734 | 12/1987 | Johnson ............................. 126/91 A X |
| 4,730,599 | 3/1988 | Kendall et al. ..................... 126/91 A |
| 4,798,192 | 1/1989 | Maruko ............................. 126/91 A |

FOREIGN PATENT DOCUMENTS

| | | |
|---|---|---|
| 276197 | 7/1914 | Fed. Rep. of Germany . |
| 1094396 | 12/1960 | Fed. Rep. of Germany ...... 432/180 |
| 190165 | 12/1922 | United Kingdom . |

Primary Examiner—Margaret A. Focarino
Attorney, Agent, or Firm—Woodling, Krost and Rust

[57] ABSTRACT

A dual burner bidirectional radiant tube heater is disclosed utilizing single throat eductors for both the supply of combustion air to the burners and for the exhaust of the products of combustion from the burners.

6 Claims, 2 Drawing Sheets

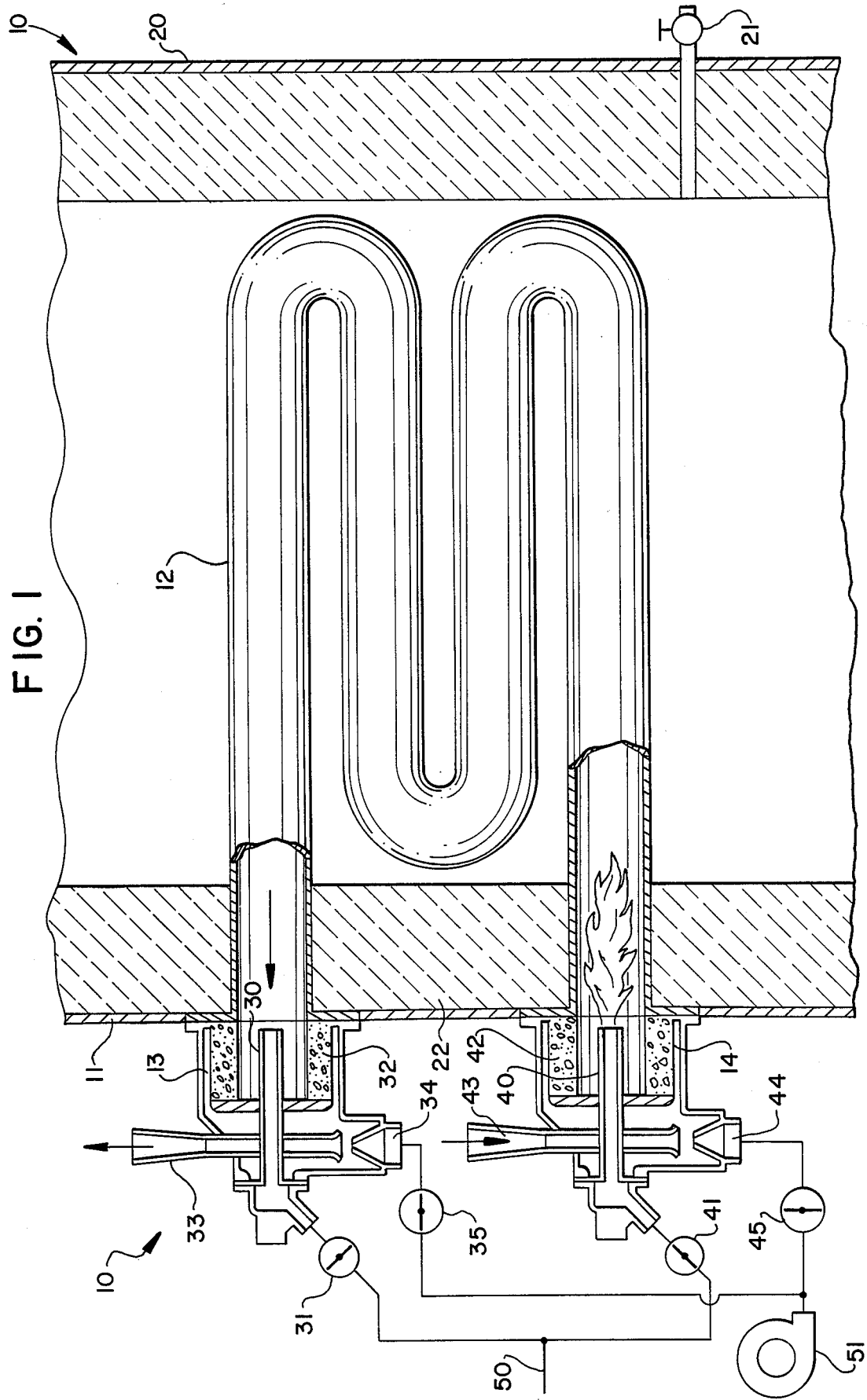

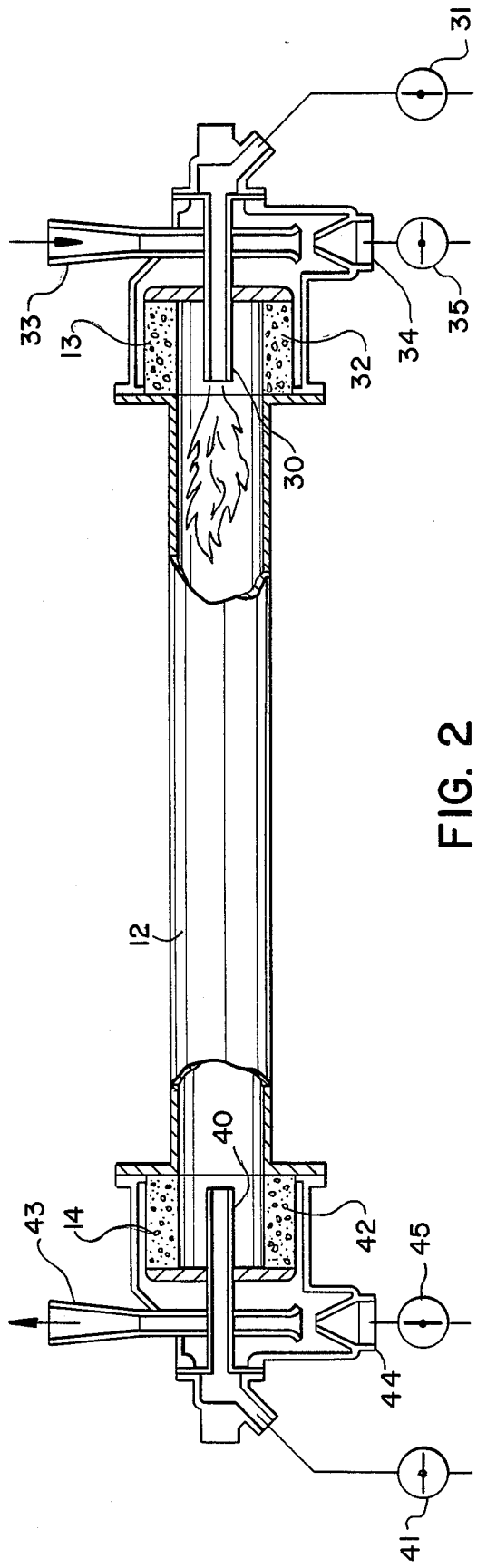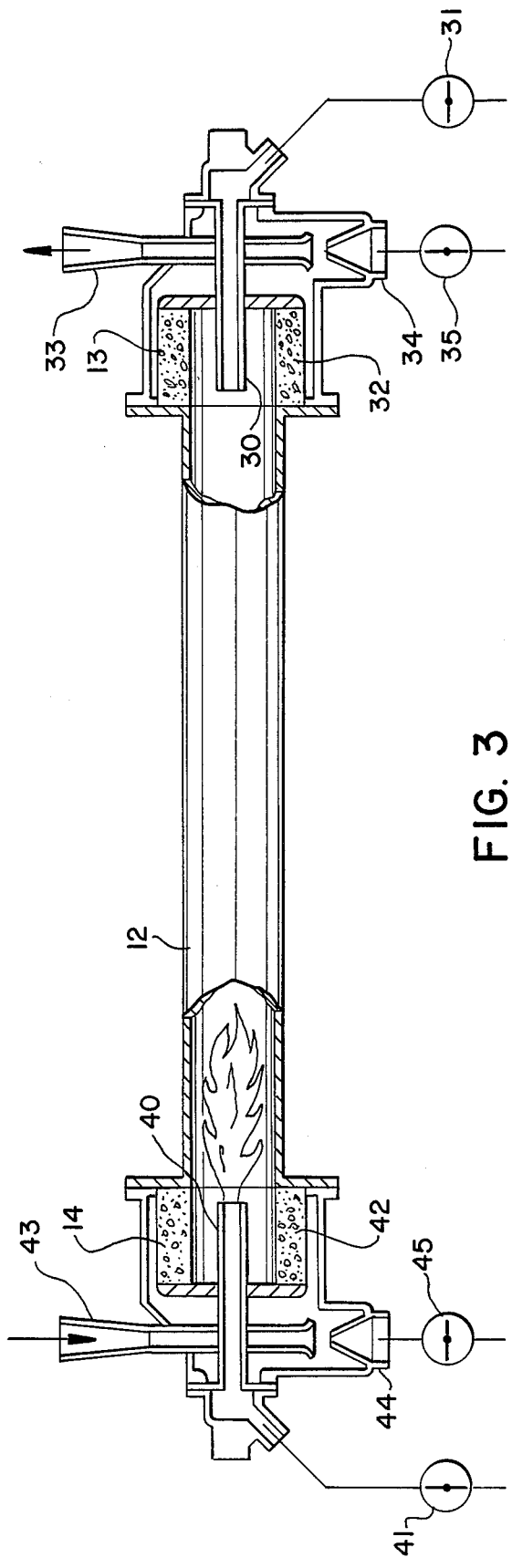

4,878,480

RADIANT TUBE FIRED WITH TWO BIDIRECTIONAL BURNERS

BACKGROUND OF THE INVENTION

This present invention relates to an improvement for gas-fired radiant tubes used to heat industrial furnaces Radiant tubes for this application are well known. In radiant tube furnaces, the products of combustion from a burner are confined within a tube with the material to be heated neighboring or surrounding the tube. The heat from the burner is thus indirectly transferred to the material via the tube, primarily by radiation and secondarily by convection. This system isolates the material being heated from the products of combustion of the burner, allowing a protective atmosphere to be maintained surrounding the material.

The radiant tubes can be fired from one end or fired alternately from either end. One end firing single burner radiant tubes are simple—needing only a source of gas and air in order to operate. However, this simplicity comes at a cost. The heat transfer rate for radiant tube heaters is limited by the maximum temperature the tube can withstand without premature tube failure. With a single burner a typical u-shaped or w-shaped tube might have a temperature of 2000F. in the hottest portion and a temperature of 1850F. in the coldest portion. If the load being heated is at 1750F., and for the purpose of this example taking no account of emissivity effects, the black body radiation from the 2000F. portion of the tube to the load is 21,960 Btu per hour per square foot of tube surface while the black body radiation from the 1850F. portion of tube is only 7,950F. Btu per hour per square foot of tube surface. The single burner radiant tube thus has problems with temperature and heat transfer rate uniformity and the accompanying difficulties (shortened tube life, contaminant buildup, etc.). If the coldest portion could be maintained at, or close to, the same 2000F. as the hottest portion, the total heat transfer to the load would be substantially increased without shortening the tube life. Firing a tube with burners at either end can accomplish this by reducing the total temperature spread on the tube to 30 to 40 degrees F. Burners at either end of the radiant tubes therefor improve temperature uniformity and consequently can increase the total heat transfer rate through the tube. They in addition can effect fuel savings by allowing the incorporation of regenerative beds with the burners. (Regenerative heat storage beds absorb and store heat from the products of combustion when the burner is in the flue mode. In the firing mode, the bed transfers some of the stored heat to the combustion air, increasing the overall efficiency of the device). However, the temperature and heat transfer rate uniformity of firing a tube with burners at either end comes at a cost of burner control complexity; in most either end firing radiant tubes the gas, combustion air and the exhaust air all must be selectively valved in order to provide for the customary alternate firing cycle. The construction of these valves, especially the exhaust air valve, is complex. The valves are prone to fail. The time and order of the selective valving also limits the operation of the radiant tube. In addition a source of supplementary combustion air is frequently needed. Therefor the temperature uniformity and other advantages of alternate firing burners at either end of a radiant tube come at a cost in the initial acquisition price, in ongoing maintenance, and in restricted operating parameters.

SUMMARY OF THE INVENTION

The invention of this present application is directed towards providing a simple method for firing a radiant tube alternately with burners at either end.

It is an object of this invention to reduce the complexity of alternately-fired radiant tubes.

It is an object of this invention to lower the cost of alternately-fired radiant tubes.

It is an object of this invention to increase the reliability of alternately fired radiant tubes.

Other objects and a more complete understanding of the invention may be had by referring to the following specification and drawings in which:

BRIEF DESCRIPTION OF THE DRAWINGS

FIG. 1 is a radiant tube furnace incorporating the bi-directional eductors of the invention.

FIG. 2 is a representational diagram of one mode of operation of the burners of FIG. 1 and FIG. 3 is a representational diagram of another mode of operation of the heater of FIG. 1.

DETAILED DESCRIPTION

The radiant tube furnace 10 of the figures includes the furnace 11, a w-radiant tube 12, and two bi-directional burners 13, 14.

The furnace 11 is designed to contain the material being heated. In the embodiment shown the tube 12 is designed to provide radiant heat to a solid material in a protective atmosphere. The furnace 11 shown in the preferred embodiment is a totally enclosed multiple radiant tube furnace having a furnace chamber some thirty feet long, six feet wide and four feet high. (For clarity a section surrounding a single radiant tube is detailed in the drawings.) The material to be heated is placed into and removed from the furnace through end openings, not shown. The material being heated in the furnace is placed within the furnace in the preferred embodiment described in the space below the radiant tube 12. The protective atmosphere is introduced into and maintained in the furnace 11 through a separate valve 21. With other materials other furnace designs would be selected as appropriate. For example, the furnace chamber could be one hundred fifty feet long, twenty feet wide, and twelve feet high or even greater. The furnace chamber could also be used for heating a fluidic or gaseous material surrounding the tube 12.

The radiant tube 12 is designed to contain the products of combustion of the burners while transferring the heat thereof to the material being heated. In the embodiment shown the radiant tube 12 is an alloy steel tube seven inches diameter and sixteen feet long extending in a generally "w" shape off a side wall 22 of the furnace 11. The tube 12 is sealed to the containment vessel so as to completely separate the inside of the tube 12 and the products of combustion from the atmosphere and material in the furnace 11, thus isolating the products of combustion of the burners 13, 14 from the protective atmosphere within the furnace 11. This avoids contamination of the protective atmosphere in the furnace. The tube 12 at the same time radiantly transfers heat to the material being heated. The "w" shape of the tube shown provides more heat transfer tube surface area than a straight tube could in the furnace 11 shown. Other tube 12 shapes, lengths and diameters are possible also.

The radiant tube 12 is heated by the pair of burners 13, 14. In the embodiment shown these burners 13, 14 are of the regenerative type with a 600,000 Btu per hour capacity. Each burner 13, 14 incorporates a fuel tube 30-40, a gas valve 31-41, a regenerative bed 32-42, an eductor 33-43, a jet nozzle 34-44 and an air valve 35-45.

The fuel tube 30-40 provides the fuel for the combustion of the burners 13-14. This fuel may be gas, liquid, solid (coal) or combinations thereof as appropriate for the application. In the preferred embodiment shown the fuel for both burners 13-14 is natural gas provided through the valves 31-41 from a single main supply source 50.

The regenerative beds 32-42 provide the heat retention-distribution beds for the regenerative operation of the burners. The regenerative beds shown are integral with the burners 13-14 arranged cylindrically about the fuel tubes 30-40 between the area of combustion and the integral eductors 33-43 (later discussed). This provides an efficient heat transfer mechanism. If desired the regenerative beds could be located separate from the burners 13-14 or eliminated entirely.

The eductors 33-43 are the main air control mechanism for the burners 13-14. The eductors 33-43 are operated by the selective passage of high pressure air through the jet nozzles 34-44. In the preferred embodiment shown the eductors 33-43 are integral with the burners 13-14 and the pressurized air for both eductors is selected by the valves 35-45 from a single source of pressurized air 51. The integral nature of the eductors makes for a more efficient package in addition to reducing the volume of "dead air" between the point of combustion in the burner and the eductor. The single source of pressurized air allows such source to be run continuously for efficient operation. Multiple sources of fuel and air could be utilized if desired. Upon the application of pressurized air to a jet nozzle the eductor associated with the jet nozzle pulls the products of combustion within the radiant tube 12 through its throat for discharge into the atmosphere (in modes of operation later described). Normally the eductors 33-43 would both have generally upwardly extending eductor throats to exhaust the products of combustion directly upwards into the atmosphere. (To clarify the presentation of the invention these eductors 33-43 are shown in the drawing of FIG. 1 oriented 90 degrees in respect to their normal upright positions (i.e. lying flat in the plane of the paper instead of protruding upwardly therefrom). The eductors could be located separately from the burners and/or at other angles if desired.

To operate the radiant tube 12, the two regenerative burners 13, 14 are selectively, alternately connected to a gas source 50 and air source 51 through the valves 31-41 and 35-45 respectively in one of two modes.

In a first mode operation (FIGS. 1 and 3) the valve 35 is open to operate the et nozzle 34. This draws combustion air down through the eductor 43 and the regenerative bed 42 (absorbing heat therefrom) to the burner 40. The burner 40 is connected to the gas source 50 to supply gas for combustion via the gas valve 41. Upon ignition by pilot (not shown) the burner 40 operates to send products of combustion through the tube 12 towards and through the non-firing burner 30. These products of combustion travel through the regenerator 32 giving up residual heat before discharge through the active eductor throat 33.

After a period of time, twenty seconds in the embodiment shown, the valves 41 and 35 are closed and the burners 13, 14 are cycled to the second mode of operation (FIG. 2). In this second mode the valve 45 is open to operate the jet nozzle 44. This draws combustion air down through the eductor 33 and the regenerative bed 32 (absorbing heat therefrom) to the burner 30. The burner 30 is connected to the gas source 50 to supply gas for combustion via the gas valve 31. Upon ignition by the pilot, the burner 30 operates to send products of combustion through the tube 12 towards and through the now inactive burner 40. This combusted air travels through the regenerator 42 giving up residual heat before discharge through the active eductor throat 43.

In these two modes of operation there is no necessity for a valve on the exhaust air or for closing the inactive eductor with a valve or otherwise artificially isolating such eductor. The inactive eductor is instead actively utilized as an air inlet. This usage not only eliminates parts (the eductor valve and the attendant needed supplementary combustion air source) but also insures that a negative pressure in the radiant tube will be maintained under all conditions of operation. A negative tube pressure is necessary to prevent contaminating the protective furnace atmosphere with products of combustion in the event a radiant tube ruptures.

In the preferred operation the eductor jet nozzles 34-44 would be operated for a short period of time before the corresponding burner 40-30 fires in order to purge the eductors of oxygen-deficient products of combustion before ignition. In the embodiment shown this purging occurs by delaying to open the gas valves 31-41 to the burners 30-40 until a brief period of time, a second, after the initiation of operation of the corresponding jet nozzle 44-34. This eliminates the momentary generation of smoke that would otherwise occur on reversal.

As the pressure drop over the inactive eductor in reverse flow is small (0.2 inches of water column), the reverse flow by itself does not have any significant contrary effect to the operation of the device.

Although the invention has been described in its preferred embodiment, it is to be realized that numerous changes may be made without deviating from the invention as hereinafter claimed.

What is claimed is:

1. An improvement for a radiant tube heating system having a bi-directional burner at the ends thereof, the bi-directional burners serving as burners for combustion air and discharge openings for products of combustion, the improvement comprising a first eductor, means to connect said first eductor to a first burner, said first eductor having a jet nozzle and a throat, a second eductor, means to connect said second eductor to a second burner, said second eductor having a jet nozzle and a throat, first means to operate the second burner and the jet nozzle of said first eductor pulling combustion air through said throat of said second eductor for firing said second burner while discharging the products of combustion thereof through said first eductor, second means to operate the first burner and the jet nozzle of said second eductor pulling combustion air through said throat of said first eductor for firing said first burner while discharging the products of combustion thereof through said second eductor and means to alternately selectively operate said first means and said second means to heat the radiant tube.

2. The improved radiant tube burner of claim 1 characterized in that the operation of said eductors provide the only supply of combustion air for said burners.

3. The improved radiant tube burner of claim 1 wherein the heating system has regenerative beds associated with the bi-directional burners and characterized by a delay within said first and second means between the operation of the eductors and the burners, said delay in the operation of the burners allowing said eductors to purge the regenerative bed of products of combustion before ignition of the burner.

4. The improved radiant tube heater of claim 3 characterized in that said delay is substantially one second.

5. The improved radiant tube heater of claim 1 characterized in that the burners are regenerative burners.

6. The improved radiant tube heater of claim 1 characterized by the addition of two regenerators, said regenerators being located between the burners and the eductor throats.

* * * * *